D. B. HUSSEY.
BALL CASTER.
APPLICATION FILED FEB. 11, 1910.
956,969.
Patented May 3, 1910.
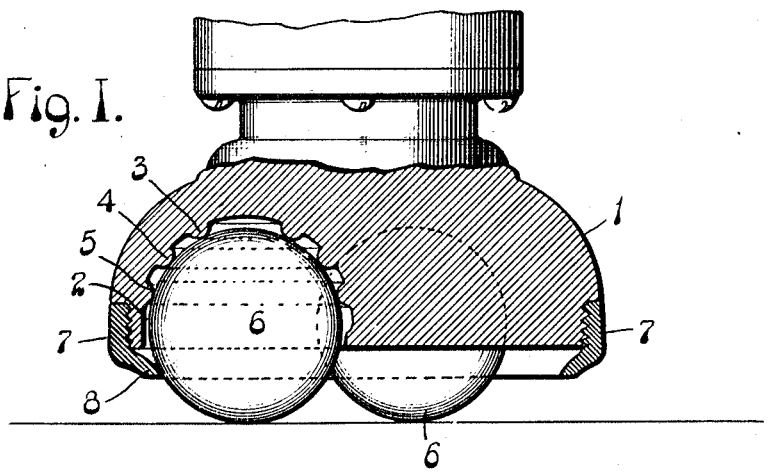
Fig. I.
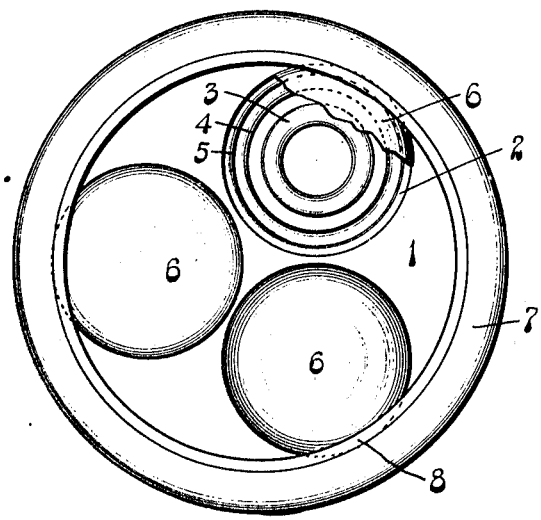
Fig. II.
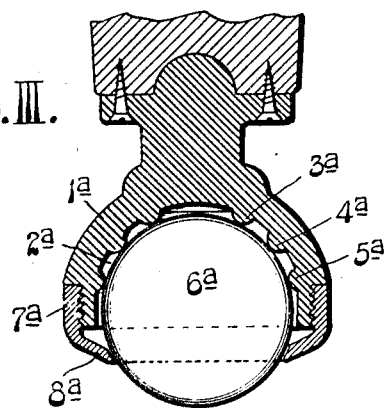
Fig. III.
Attest
W. J. McCauley
E. B. Linn
Inventor:
D. B. Hussey
by
Atty.

UNITED STATES PATENT OFFICE.

DENNIS B. HUSSEY, OF ST. LOUIS, MISSOURI.

BALL-CASTER.

956,969.     Specification of Letters Patent.     Patented May 3, 1910.

Application filed February 11, 1910. Serial No. 543,272.

*To all whom it may concern:*

Be it known that I, DENNIS B. HUSSEY, a citizen of the United States of America, residing in the city of St. Louis and State of Missouri, have invented certain new and useful Improvements in Ball-Casters, of which the following is a full, clear, and exact description, reference being had to the accompanying drawings, forming part of this specification.

My invention relates to a ball caster, and it has for its object the production of a caster of this description that is of an extremely simple and inexpensive nature, and in which the bearing parts are so designed as to afford a minimum of friction between a caster ball and the body in which it is seated without utilizing ball bearings, as it is common to do, against which the caster balls rest and which are utilized for the purpose of lessening frictional contact between the caster balls and the bodies of the casters.

Figure I is a vertical section through my caster. Fig. II is an enlarged plan view of the caster, with one of the balls partly broken away. Fig. III is a vertical section of a modification.

In the accompanying drawings:—1 designates the body of my caster which is designed to be secured to an article of furniture, or any other article that it may be desired to support by the casters, in any suitable manner. The caster body 1 is provided with a plurality of pockets 2 extending upwardly therein from its bottom, there being 3 of such pockets illustrated in the construction shown in Figs. I and II, although there may be any other desired number of the pockets. Each pocket 2 is of semi-spherical shape and within each pocket is a series of annular ribs 3, 4 and 5, concentric with each other, the rib 3 being a crown rib located near the top of the pocket, the rib 4 being an intermediate rib, and the rib 5 a bottom rib. These three ribs are of different diameters, the crown rib 3 being of the smallest diameter, the intermediate rib 4 being of greater diameter than the crown rib, and the bottom rib 5 being of still greater diameter.

6 designates the caster balls that are seated in the pockets 2 and which contact with all of the ribs 3, 4 and 5 in the pockets they occupy.

7 designates a retaining ring secured to the caster body 1 by any suitable means, and preferably by screw threads formed respectively upon the exterior of the caster body at its base and the interior of the retaining ring. The retaining ring is provided with a bottom flange 8 that extends inwardly from the body of the ring, so that it is constantly present beneath segments of the caster balls, and acts to retain said balls in their respective pockets.

It will be seen that the several concentric ribs in the pockets of the body of my caster afford restricted bearing surfaces for the balls that are seated in the pockets, while maintaining the balls out of contact with the greater proportion of the surfaces within the pockets and, as a consequence, the balls may turn in any direction with very slight resistance to their movement, due to the minimum of frictional contact between the balls and body of the caster afforded by the concentric ribs.

In Fig. III I have shown a modification in which a single ball 6ª is mounted in a body 1ª containing a single pocket 2ª, as distinguished from the employment of a plurality of balls for the support of the caster body. In this modification, the single pocket contains concentric ribs 3ª, 4ª, and 5ª, corresponding in contour and utility to those numbered 3, 4, and 5, previously described. The ball 6ª is maintained in its seat in the caster body by the retaining ring 7ª having an inwardly extending flange 8ª which, as will be apparent, completely surrounds the ball 6ª in the modified construction, instead of only partially surrounding each of the balls in the first described construction.

I claim:—

1. A ball caster, comprising a body having a pocket therein and provided with a plurality of endless concentric ribs in said pocket, and a ball seated in said pocket and resting against said ribs.

2. A ball caster, comprising a body having a pocket therein and provided with a plurality of endless concentric ribs in said pocket, a ball seated in said pocket and resting against said ribs, and a retaining ring secured to said body and having an inwardly extending flange located beneath the body whereby said ball is held within said pocket.

DENNIS B. HUSSEY.

In the presence of—
EDNA B. LINN,
A. J. MCCAULEY.